United States Patent
Chen et al.

(10) Patent No.: US 9,305,243 B2
(45) Date of Patent: Apr. 5, 2016

(54) ADAPTABLE CLASSIFICATION METHOD

(71) Applicant: National Taiwan University, Taipei (TW)

(72) Inventors: Argon Cheng-Kang Chen, Taipei (TW); Chiung-Nien Chen, Taipei (TW); Wen-Hung Kuo, Taipei (TW); Shu-Chuan Chuang, Taipei (TW)

(73) Assignee: National Taiwan University, Taipei (TW)

( * ) Notice: Subject to any disclaimer, the term of this patent is extended or adjusted under 35 U.S.C. 154(b) by 304 days.

(21) Appl. No.: 13/954,244

(22) Filed: Jul. 30, 2013

(65) Prior Publication Data

US 2014/0270493 A1 Sep. 18, 2014

(30) Foreign Application Priority Data

Mar. 13, 2013 (TW) ................................ 102108802

(51) Int. Cl.
*G06T 7/00* (2006.01)
*G06N 99/00* (2010.01)
*G06K 9/62* (2006.01)

(52) U.S. Cl.
CPC ............ *G06K 9/6257* (2013.01); *G06K 9/6277* (2013.01); *G06N 99/005* (2013.01); *G06T 7/0012* (2013.01); *G06T 2207/20076* (2013.01); *G06T 2207/20081* (2013.01); *G06T 2207/30068* (2013.01); *G06T 2207/30096* (2013.01)

(58) Field of Classification Search
None
See application file for complete search history.

(56) References Cited

U.S. PATENT DOCUMENTS

| 2010/0061609 | A1* | 3/2010 | Shinagawa et al. | 382/131 |
| 2010/0098306 | A1* | 4/2010 | Madabhushi et al. | 382/128 |
| 2010/0232686 | A1* | 9/2010 | Dewan et al. | 382/159 |

OTHER PUBLICATIONS

Yoon et al, AdaBoost-based multiple SVM-RFE for classification of mammograms in DDSM, 2008.*
Zhang et al, Building an ensemble system for diagnosing masses in mammograms, 2011.*

* cited by examiner

*Primary Examiner* — Stanley K Hill
*Assistant Examiner* — Mikayla Chubb
(74) *Attorney, Agent, or Firm* — Mintz Levin Cohn Ferris Glovsky and Popeo, P.C.; Peter F. Corless; Steven M. Jensen

(57) ABSTRACT

An adaptable classification method is provided. The method performs the classification by using a classification standard having a plurality of categories. The classification standard is classified into different categories based on probability ranges. The adaptable classification method includes training a classifying device with a plurality of samples and using the trained classifying device to determine the categories of the samples to obtain classification model scores of the samples, transferring, by using logistic-like functions, the classification model scores into probability values; and adjusting parameters of logistic-like functions to iterate the training of the classifying device such that the probability values conform to value ranges corresponding to categories of the classification standard. The adaptable classification method is applicable to various classification methods based on the probability ranges, and can also retrieve a specific category from the classified categories for further classification to increase the efficacy.

8 Claims, 8 Drawing Sheets

| BI-RADS Category | 3 | 4A | 4B | 4C | 5 |
|---|---|---|---|---|---|
| malign probability | 0~0.02 | 0.02~0.25 | 0.25~0.5 | 0.5~0.89 | 0.89~1 |

FIG. 3

| reference number | 1 | classifying device | 1&2 | total votes | 70 | category | 4.1 |
|---|---|---|---|---|---|---|---|

| majority opinion | vote | ratio |
|---|---|---|
| edge bumpiness of a tumor | 14 | 0.2000 |
| relative hardness of the interior edge of a tumor | 9 | 0.1286 |
| edge bumpiness of a tumor | 6 | 0.0857 |
| hardness of the exterior edge of a tumor | 4 | 0.0571 |
| interior heterogeneity of a tumor | 3 | 0.0429 |
| lightness difference inside the tumor in relative with rear echo shadow area | 3 | 0.0429 |
| elative hardness of the interior edge of a tumor | 3 | 0.0429 |
| lightness difference of rear echo shadow area in relative with two adjacent side areas | 2 | 0.0286 |
| growth direction of the tumor (horizontal flat) | 2 | 0.0286 |
| growth direction of the tumor (long straight) | 1 | 0.0143 |
| edge smoothness of a tumor | 1 | 0.0143 |

| minority opinion | vote | ratio |
|---|---|---|
| edge bumpiness of a tumor | 5 | 0.0714 |
| relative hardness of the interior edge of a tumor | 3 | 0.0429 |
| edge bumpiness of a tumor | 3 | 0.0429 |
| lightness difference of rear echo shadow area in relative with two adjacent side areas | 2 | 0.0286 |
| hardness of the exterior edge of a tumor | 2 | 0.0286 |
| relative hardness of the interior edge of a tumor | 2 | 0.0286 |
| growth direction of the tumor (long straight) | 1 | 0.0143 |
| interior heterogeneity of a tumor | 1 | 0.0143 |
| lightness difference inside the tumor in relative with rear echo shadow area | 1 | 0.0143 |
| growth direction of the tumor (horizontal flat) | 1 | 0.0143 |
| interior heterogeneity of a tumor | 1 | 0.0143 |

FIG. 8

ADAPTABLE CLASSIFICATION METHOD

CROSS-REFERENCES TO RELATED APPLICATIONS

This application claims under 35 U.S.C. §119(a) the benefit of Taiwanese Application No. 102108802, filed Mar. 13, 2013, the entire contents of which is incorporated herein by reference.

BACKGROUND OF THE INVENTION

1. Field of the Invention

This invention relates to classification techniques, and, more particularly, to an adaptable classification method performing a classification process according to probability values.

2. Description of Related Art

In the category classification of tumor diagnosis, each category has a restrict regulation for the malign probability range. With regard to Breast Imaging Reporting and Data System (BI-RADS), each category defines a malign probability range thereof and the subsequent management in response. The prior or published reports discriminate malignance from benignancy or calculate the probability of malign tumor in major, rather addressing the probability range of diagnosis category for classification.

Since different categories correspond to different subsequent clinical managements, a more precise discrimination is needed for some critical categories to avoid an inappropriate management. For example, although BI-RADS has categories of 1, 2, 3, 4.1, 4.2, 4.3 and 5 to 6 and the categories correspond different treatments, the discrimination between categories 3 and 4.1 decides whether an examination of tumor core needle biopsy is conducted, and takes periodical examinations or a further medical management based on the examination of tumor biopsy. If a rough classification is performed for all categories, there will not be a more precise discrimination for critical categories, which may result in an inappropriate subsequent clinic management due to the inaccurate classification result.

The category classification of tumor should provide a lesion report for the final determination of the category, for example, the categories of BI-RADS provide different descriptions for the lesion. However, presently the classification method does not provide related information basis for classification, thereby limiting the range of clinical application.

SUMMARY OF THE INVENTION

The present invention provides an adaptable classification method. A classifying device categorizes samples. A logistic-like function transfers the classified simples into probability values, and parameters of the logistic-like function are adjusted, in order for the probability values of the samples to conform to a value range corresponding a plurality of categories of a predetermined classification standard.

The present invention provides an adaptable classification method, which performs the classification by using a classification standard having a plurality of categories, wherein the categories are discriminated by the probability values. The adaptable classification method comprises: (1) providing a plurality of samples to train a classifying device; (2) determining categories of the samples, by using the trained classifying device, to obtain classification model scores of the samples; (3) transferring the classification model scores into probability values by logistic-like functions having parameters, and classifying the probability values into the categories based on the classification standard; and (4) determining whether the probability values conform to a value range corresponding to the categories of the classification standard, and stopping training the classifying device if the probability values conform to the value range, or adjusting the parameters of the logistic-like functions and transferring the classification model scores into new probability values by the adjusted logistic-like functions and iterating step (4) to determine whether the new probability values conform to the value range.

In an embodiment, the adaptable classification method further comprises classifying the classified samples into at least two subcategories, and performing steps (1) to (4) on the subcategories.

From the above, the adaptive classification method according to the present invention adjusts the parameters of a logistic-like functions during the classification of samples such that the classified samples conform to the value range corresponding to the categories of the classification standard. Moreover, critical categories of the classification result can be retrieved to perform the second classification to improve the accuracy of the classification result. Further, the method of the present invention is applicable to any methods based on the probability range.

BRIEF DESCRIPTION OF DRAWINGS

FIG. 3 is a reference table of BI-RADS classification standard and malign probability;

FIG. 8 is a classification table of tumor characteristics.

DETAILED DESCRIPTION OF THE INVENTION

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
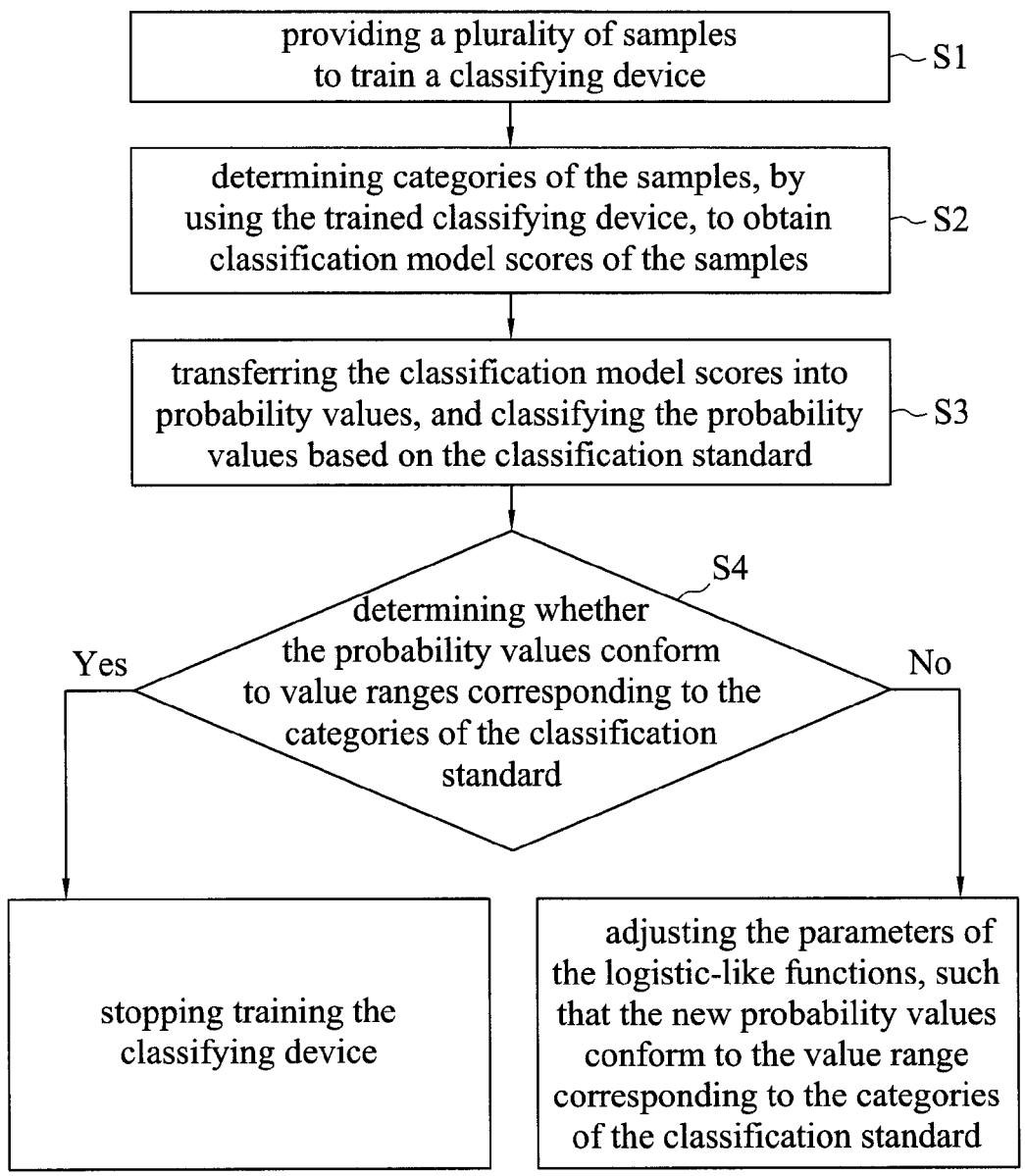
FIG. 1 is a flow chart of an adaptable classification method according to the present invention.

Please refer to FIG. 1, which is a flow chart of an adaptable classification method according to the present invention. In step S1, a plurality of samples are provided to train a classifying device. The method proceeds to step S2. In step S2, the trained classifying device determines categories of the samples to obtain classification model scores of the samples. The method proceeds to step S3. In step S3, logistic-like functions having parameters transfer the classification model scores into probability values, and categorizes the probability values into the categories based on the classification standard. The method proceeds to step S4. In step S4, whether the probability values conform to the value range corresponding to the categories is determined. If the probability values conform to the value range, training the classifying device is stopped, or the parameters of the logistic-like functions are adjusted, the classification model scores are transferred into a new probability value by the adjusted logistic-like functions, and step S4 is iterated to determine whether the new probability values conform to the value range corresponding to the categories.

Figure 2:
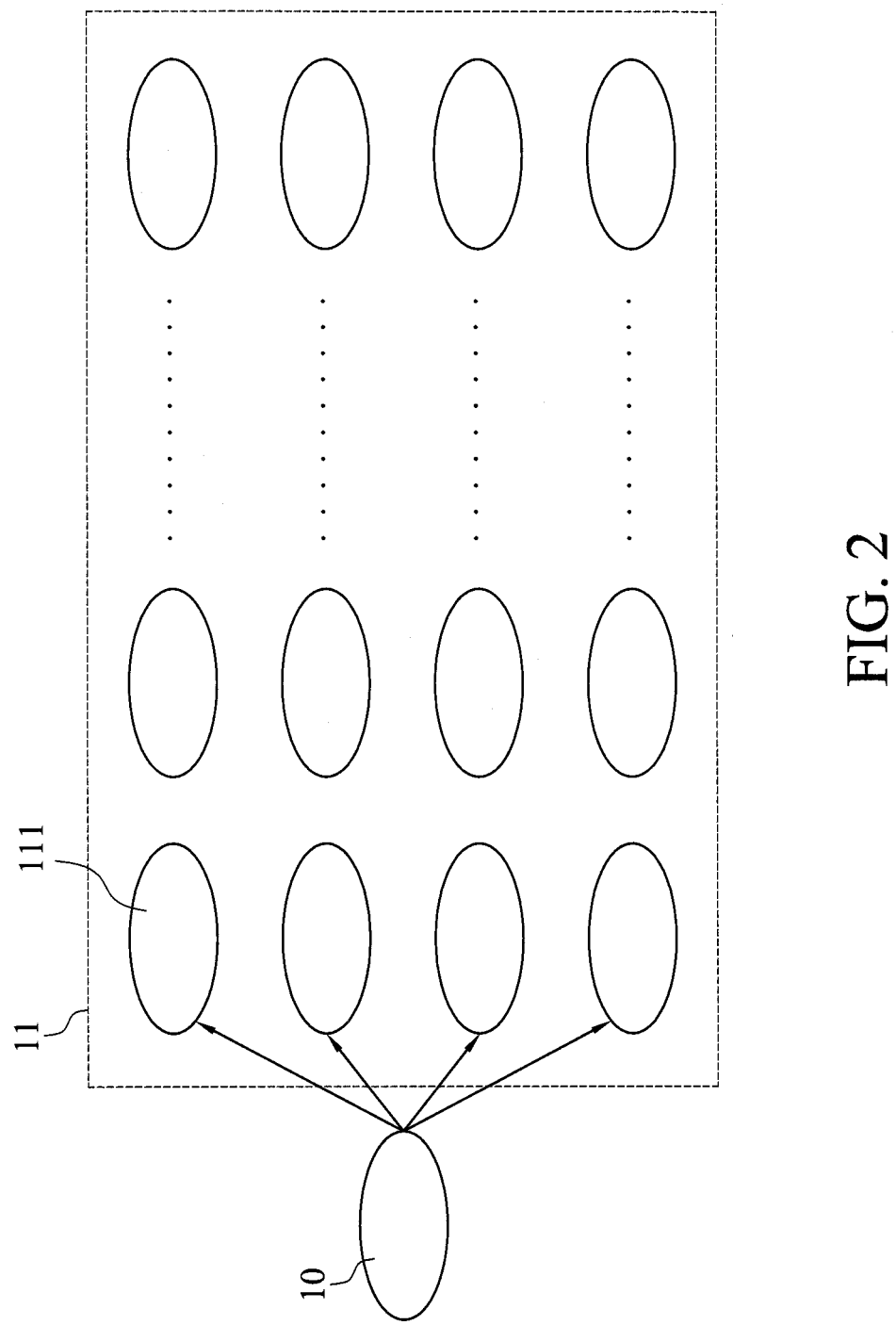
FIG. 2 is a diagram illustrating training a classification device according to the present invention.

Please refer to FIG. 2, which is a diagram illustrating training a classification device according to the present invention. The adaptable classification method according to the present invention performs the classification by a predetermined classification standard that has a plurality of categories discriminated by the probability. The plurality of categories of classification standard have corresponding value ranges.

The adaptable classification method according to the present invention provides a classifying device 11. In an embodiment, the classifying device 11 is an enhance classifying device 11 comprising a plurality of sub-classifying devices 111. The adaptable classification method then provides a plurality of samples 10 with known classification results, and randomly chooses from the plurality samples 10 to train the plurality of sub-classifying devices 111 of the classifying device 11. The training method is to randomly retrieve a plurality of samples corresponding to the number of the sub-classifying devices 111 for the classification training of the sub-classifying devices 111 of the classifying device 11. The randomly retrieved sample at each time only trains one sub-classifying device 111, and is returned to the provided plurality of samples 10 after the sub-classifying device 111 is trained completely. Then, a sample is randomly retrieved again for the classification training of the next sub-classifying device 111.

For example, if the classifying device 11 comprises m sub-classifying devices 111 and one sample is randomly retrieved from the provided plurality of samples 10 to train a sub-classifying device 111, and the sample is returned to the original provided plurality of samples 10 after the training of one sub-classifying device 111 is complete, and a next sample is randomly retrieved to train the next sub-classifying device 111 until the trainings of m sub-classifying devices are complete. In this training method, the randomly retrieved sample may be repeated, but it will not influence the training result.

In a subsequent classification process, a sample is classified by the sub-classifying devices 111 of the classifying device 11, and the classification results of the sub-classifying devices 111 are integrated to form a classification result of the classifying device 11, wherein the classifying device 11 according to the present invention is a linear or nonlinear statistic learning classifying device or mechanical learning classifying device.

During the construction of a classifying device 11, since the larger number of sub-classifying devices 111 is not necessarily better, the present invention applies a fold cross validation to determine the number of sub-classifying device 111.

After the classifying device 11 is trained completely, the classifying ability of the classifying device 11 is verified. The classification of the samples 10 is determined by the classifying device 11, and a classification model score F(x) if the samples 10 are thereby obtained. If the classifying device 11 comprises m sub-classifying devices 11, the computation result of the classifying device 11 is defined as follow.

$$F(x) = \Sigma_1^M c_m f_m(x),$$

where $f_m(x)$ is the classification result of the $m^{th}$ sub-classifying device 111 to a single sample 10, $f_m(x)$ returns a value +1 or −1 as the classification result, Cm is a weight for the $m^{th}$ sub-classifying device 111, and the weight is obtained by a Discrete AdaBoost algorithm based on the determination ability of the classification of the sub-classifying devices 111 to the samples 10. Different weights are given to the sub-classifying devices 111 upon a calculation.

Please refer to FIG. 3, which is a reference table of BI-RADS classification standard and malign probability. As shown in the reference table, the categories in FIG. 3 have their respective value ranges of malign tumor.

In an embodiment, the classification standard is Breast Imaging Reporting and Data System (BI-RADS). The classification standard has a total of nine categories, excluding category 0 as incomplete date, category 1 as no tumor observed, category 2 as determined benign tumor and category 6 as determined malign tumor, else categories 3, 4.1, 4.2, 4.3 and 5 respectively have probability ranges of determined malign tumor, and the probability range increase from 3 to 5. Therefore, only the classification applications of the adaptable classification method according to categories 3 to 5 of BI-RADS classification standard according to the present invention are specified.

The present invention performs classification based on a classification standard using the probability to classify. Each category has a corresponding probability range in the applied BI-RADS classification standard in order to classify the samples 10 according to a probability range of the categories. Therefore, the results of the samples 10 through the classification determination of the sub-classifying devices 111 are presented as y=+1 and y=−1, wherein y=+1 indicates a malign determination result and y=−1 indicates a benign determination result. If the determination result is malign, the definition of logistic-like function is as follow.

$$P(y = +1 \mid x) = \frac{e^{\alpha F(x)}}{1 + e^{\alpha F(x)}}$$

If the determination result indicates benign, the definition of logistic-like function is as follow.

$$P(y = -1 \mid x) = \frac{1}{1 + e^{\alpha F(x)}}$$

where α is a parameter of logistic-like functions for adjusting the result of the logistic-like functions.

After the classification model scores of the samples 10 are transferred into probability values through logistic-like functions, the transferred probability values are then classified into five subsets based on BI-RADS classification standard, and the probability values included in the subsets are determined whether the probability values conform to the value ranges corresponding to the categories of the BI-RADS classification standard. If the probability values conform to the value ranges, the classifying device is trained completely and the training is stopped. If the probability values do not conform to the value ranges, the parameter α of logistic-like functions should be adjusted such that the classification model scores of the samples 10 are transferred into new probability values by the adjusted logistic-like functions, and the determination of whether the new probability values conform to the value ranges corresponding to the categories of the classification standard is iterated.

Figure 4:
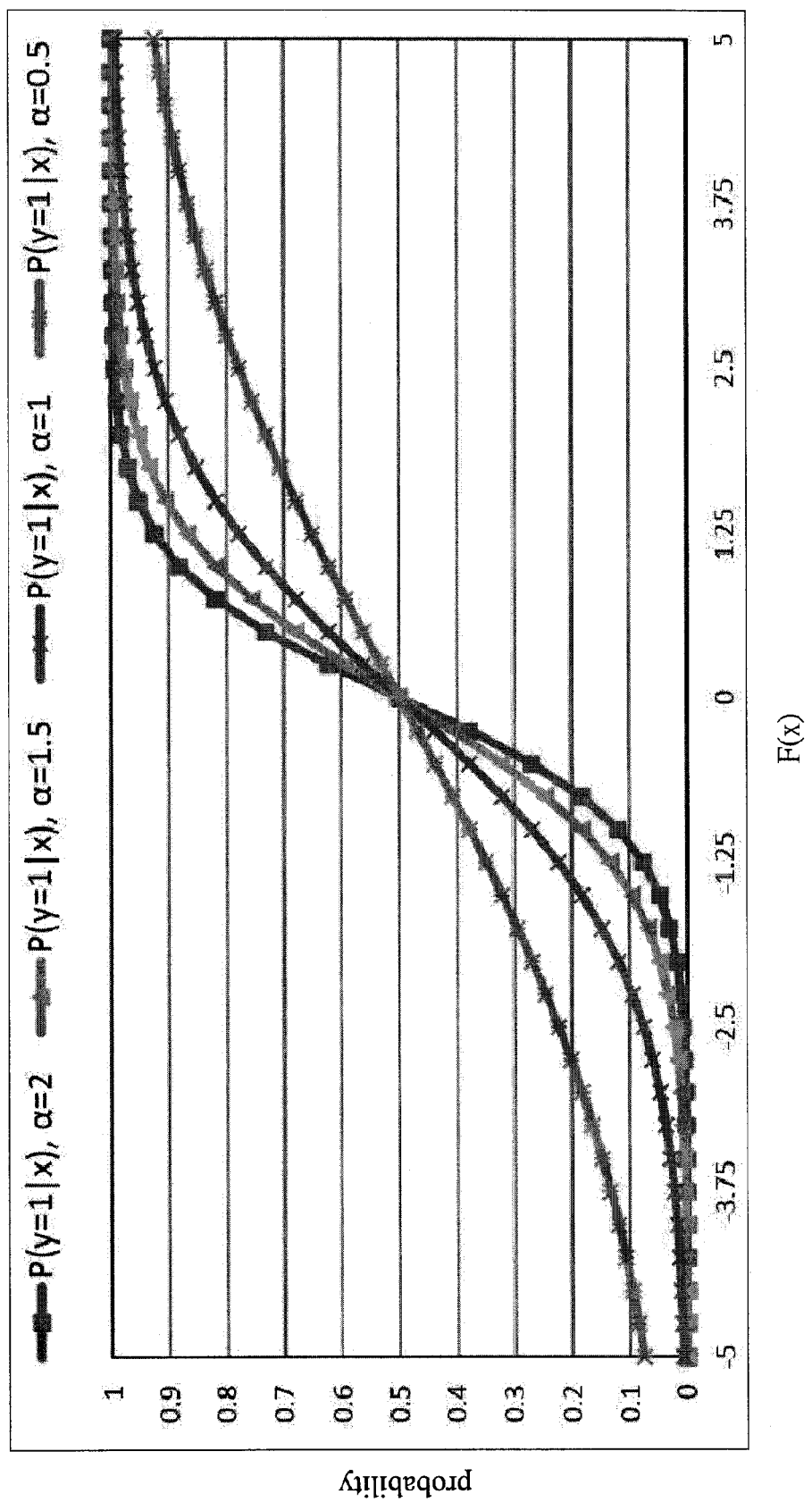
FIG. 4 is a graph of parameter adjustments.

Please also refer to FIG. 4, which is a graph illustrating parameter adjustments. As shown in FIG. 4, the horizontal axis indicates the classification model scores, and the longitudinal axis indicates the transferred probability values. The graph also shows that a can be different parameters, such as 0.5, 1, 1.5, 2 and other to change the distribution of the probability vales. When the parameter α equals to 0.5, the transferred probability values are distributed between the interval of 0 to 1 in average. When the parameter α becomes larger, the distribution of probability values become extremer.

If the transferred probability values of the classification model scores of logistic-like functions do not conform to the probability value ranges of the classification standard, the parameter α should be adjusted, wherein the adjustment of the parameter α is based on the adjustment rule of the first parameter. The adjustment rule of the first parameter comprises:

1. The number of malign instances in $S_{BIRADS3}^{Ensemble1}$ equals to 0, wherein $S_{BIRADS3}^{Ensemble1}$ is a subset of category 3;

2. When the rule 1 is satisfied, the one having the most samples remaining in $S_{BIRADS3}^{Ensemble1}$ is selected;

3. If the number of parameter α satisfying rule 2 is more than one, then compares the summation of squares differences of malign probability and the malign probability point in a set of standard BI-RADS in five subsets. The one with the smallest summation of squares differences is selected as an elected parameter, and the method of calculation is as follow.

$$SSD_{Ensemble1}^2 = \left[\left(\frac{N_{Mal}^{S_{BIRADS3}^{Ensemble1}}}{N^{S_{BIRADS3}^{Ensemble1}}}\right)|\alpha| - 0.01\right]^2 +$$

$$\left[\left(\frac{N_{Mal}^{S_{BIRADS4,1}^{Ensemble1}}}{N^{S_{BIRADS4,1}^{Ensemble1}}}\right)|\alpha| - 0.135\right]^2 + \left[\left(\frac{N_{Mal}^{S_{BIRADS4,2}^{Ensemble1}}}{N^{S_{BIRADS4,2}^{Ensemble1}}}\right)|\alpha| - 0.375\right]^2 +$$

$$\left[\left(\frac{N_{Mal}^{S_{BIRADS4,3}^{Ensemble1}}}{N^{S_{BIRADS4,3}^{Ensemble1}}}\right)|\alpha| - 0.695\right]^2 + \left[\left(\frac{N_{Mal}^{S_{BIRADS5}^{Ensemble1}}}{N^{S_{BIRADS5}^{Ensemble1}}}\right)|\alpha| - 0.945\right]^2$$

In the calculation, the parameter α increases from 0 to 2 in an increment of 0.01. That is, α=0, 0.01, . . . , 2; and wherein $S_{BIRADS3}^{Ensemble1}$ presents a subset of category 3, $N_{Mal}^{S_{BIRADS3}^{Ensemble1}}$ presents the number of malign instances in the subset $S_{BIRADS3}^{Ensemble1}$, $N^{S_{BIRADS3}^{Ensemble1}}$ presents the amount of samples in $S_{BIRADS3}^{Ensemble1}$; $S_{BIRADS4.1}^{Ensemble1}$ presents a subset of category 4, $N_{Mal}^{S_{BIRADS4.1}^{Ensemble1}}$ presents the number of malign instances in the subset $S_{BIRADS4.1}^{Ensemble1}$, $N^{S_{BIRADS4.1}^{Ensemble1}}$ presents the amount of samples in $S_{BIRADS4.1}^{Ensemble1}$, and so on;

4. If the number of parameter satisfying rule 3 is more than one, then the parameter closest to the theoretical value 2 is selected as an elected parameter.

Since category 3 to category 5 are applied to classify malign tumors in the BI-RADS classification standard and the malign probability of category 3 as shown in FIG. 3 approximates to 0, the parameter α with the most samples classified in category 3 is selected as the best parameter for the parameter adjustment in the adjustment rule of the first parameter.

After the parameter adjustment, logistic-like functions with adjusted parameter are applied to once transfer the classification model score of each sample into a new probability value. Each new probability value is once repeatedly determined whether conform the range of values corresponding to each category of the classification standard, until the probability value of the samples 10 conform to the value ranges corresponding to the categories and the samples that the probability values belong are correspondingly classified into a plurality of categories of the classification standard.

After the abovementioned initial classification, a plurality of samples can be classified based on the BI-RADS classification standard. However, the abovementioned classification process is an initial classification, and the result thereof still may not be accurate enough. For example, in the samples classified as category 3, minority of malign tumor samples might exist. The classification result is not an ideal result.

In the BI-RADS classification standard, the determination between category 3 and category 4.1 is the most critical part in the BI-RADS classification standard. If the category is determined as 3, the tumor determination result indicates benign, and the management only requires regular visits and the follow up observation. If the determination result is 4.1, the tumor determination result indicates malign, and an examination of core needle biopsy is necessary to be conducted.

Therefore, in order to promote the accuracy of classification result, the adaptable classification method of the present invention provides a hierarchical classification method, i.e., further classifying the classification result obtained above.

Figure 5:
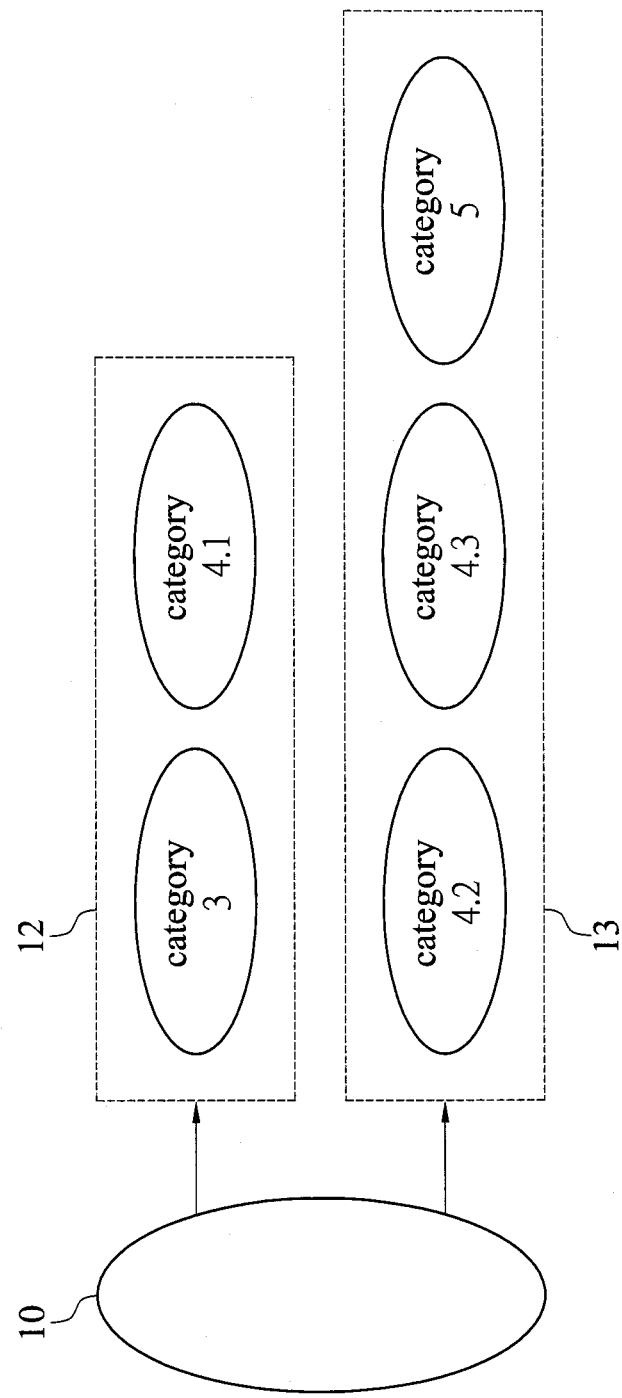
FIG. 5 is a diagram illustrating first classification according to the present invention.

Please refer to FIG. 5, which is a diagram illustrating first classification according to the present invention. In order to perform a second classification to the above classification result, the plurality of samples 10 classified above are classified into at least two subcategories which include a first subcategory 12 and a first final category 13, for example. The first subcategory 12 is a more critical category predetermined in the classification standard. For example, with regard to BI-RADS classification standard, the determination between category 3 and category 4.1 will decide whether a tumor core needle biopsy is required to be conducted on the patient. Therefore, category 3 and category 4.1 are classified in the first subcategory to perform a second classification.

Categories 4.2 to 5, since the tumor is determined as malign, are classified into the first final category 13 for the result integration of the second classification to perform the classification of malign tumors.

In an embodiment, although the subcategories obtained in the initial classification are a first subcategory 12 and a first final category 13, the classification method is only for the convenience of specifying the implementation method. In the actual implementation, the number of first category 12 may be more than one.

Figure 6:
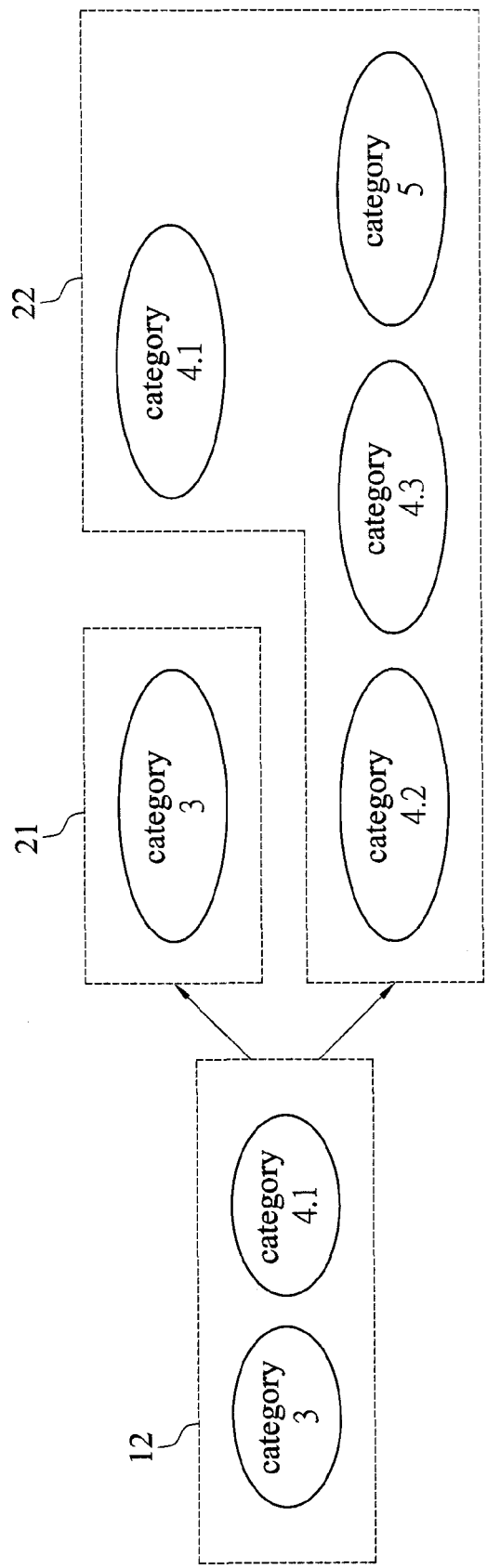
FIG. 6 is a diagram illustrating second classification according to the present invention.

Please refer to FIG. 6, which is a diagram illustrating second classification according to the present invention. In the process of second classification, a first category 12 including category 3 and category 4 in the initial classification result is retrieved to perform a second classification. The method of second classification is the same as the first classification. First, a second classifying device 11 comprising a plurality of sub-classifying devices 111 is provided. Then, samples of the first subcategory 12 are applied to perform the training to the second classifying device 11 which comprises a plurality of sub-classifying devices 111. Next, the trained classifying device 11 is applied to determine the classification of the first subcategory 12 based on five categories of BI-RADS such that the classification model scores of the samples in the first subcategory are obtained. Afterward, the plurality of classification model scores are transferred into probability values by logistic-like functions and classified into five subsets based on the BI-RADS classification standard as shown in FIG. 3. Then, whether the probability values of the subsets conform to the value ranges corresponding to five categories of the BI-RADS classification standard is determined. If the probability values conform to the value ranges, the training of the classifying device is stopped, or the parameter α of the logistic-like functions is adjusted according to the adjustment rule of the second parameter. Moreover, the classification model scores of the samples are transferred into new probability values by the adjusted logistic-like functions, and the determination of whether the new probability values conform to the value ranges corresponding to the plurality of categories of the classification standard is determined.

In the second classification, the adjustment rule of the second parameter α comprises:

1. The number of malign instances in $S^{Ensemble2}_{BIRADS3}$ equals to 0, wherein $S^{Ensemble2}_{BIRADS3}$ is a subset of category 3;

2. When the rule 1 is satisfied, the one having the most samples remaining in $S^{Ensemble2}_{BIRADS3}$ is selected;

3. If the number of parameter satisfying rule 2 is more than one, then compares the summation of squares differences of malign probability and the malign probability point in a set of standard BI-RADS in two subsets of $S^{Ensemble2}_{BIRADS3}$ and $S^{Ensemble2}_{BIRADS4.1}$. The one with the smallest summation of squares differences is selected as an elected parameter, and the method of calculation is as follow.

$$SSD^2_{Ensemble1} = \left[\left(\frac{N^{S^{Ensemble1}_{BIRADS3}}_{Mal}}{N^{S^{Ensemble1}_{BIRADS3}}}\right)|\alpha| - 0.01\right]^2 +$$
$$\left[\left(\frac{N^{S^{Ensemble1}_{BIRADS4.1}}_{Mal}}{N^{S^{Ensemble1}_{BIRADS4.1}}}\right)|\alpha| - 0.135\right]^2 + \left[\left(\frac{N^{S^{Ensemble1}_{BIRADS4.2}}_{Mal}}{N^{S^{Ensemble1}_{BIRADS4.2}}}\right)|\alpha| - 0.375\right]^2 +$$
$$\left[\left(\frac{N^{S^{Ensemble1}_{BIRADS4.3}}_{Mal}}{N^{S^{Ensemble1}_{BIRADS4.3}}}\right)|\alpha| - 0.695\right]^2 + \left[\left(\frac{N^{S^{Ensemble1}_{BIRADS5}}_{Mal}}{N^{S^{Ensemble1}_{BIRADS5}}}\right)|\alpha| - 0.945\right]^2$$

In the calculation, $S^{Ensemble2}_{BIRADS4.1}$ presents a subset of category 4.1 in the second classification, and wherein the parameter α increases from 0 to 2 in an increment of 0.01. That is, α=0, 0.01, . . . , 2; $N^{S^{Ensemble1}_{BIRADS3}}_{Mal}$ presents the number of malign instances in the subset $S^{Model2}_{BIRADS3}$, $N^{S^{Ensemble1}_{BIRADS3}}$ presents the amount of samples in $S^{Model2}_{BIRADS3}$, and so on.

4. If the number of parameter satisfying rule 3 is more than one, then the parameter closest to the theoretical value 2 is selected as an elected parameter.

The second classification is to distinguish the tumor instances between category 3 and category 4 addressing to the instances with unobvious malign characteristics. Therefore, except the adjustment of a, a filtering mechanism is additionally set in the second classification.

The mechanism takes the definition and smoothness of the profile of samples as a filtering standard. A set threshold value is the median of properties relating to edge bumpiness and edge smoothness in the first subcategory 12. If any sample has an edge smoothness lower than the threshold or an edge bumpiness higher than the threshold, the sample will not be considered as a possible sample of category 3.

After the second classification, the second classification result is similarly classified into at least two groups of sub-categories including a second category 21 and a second final category 22.

The category 3 obtained in the second classification can almost be sure is benign. Therefore, the category 3 obtained in the second classification is classified to the second category 21 and is retained. Next, the remaining four categories are classified to the second final category 22. Then, the second final category 22 and the first final category 13 are integrated to perform the last classification of malign tumor categories 4.2 to 5.

It should be note that although the second classification is performed for one time in the embodiment, this part of description is only utilized for specifying the method of implementation. In the actual implementation, the second classification can be performed more than one time depending on the condition, for example, too many samples in the second subcategory 21, or further improvement for the accuracy of critical categories is desired.

Figure 7:
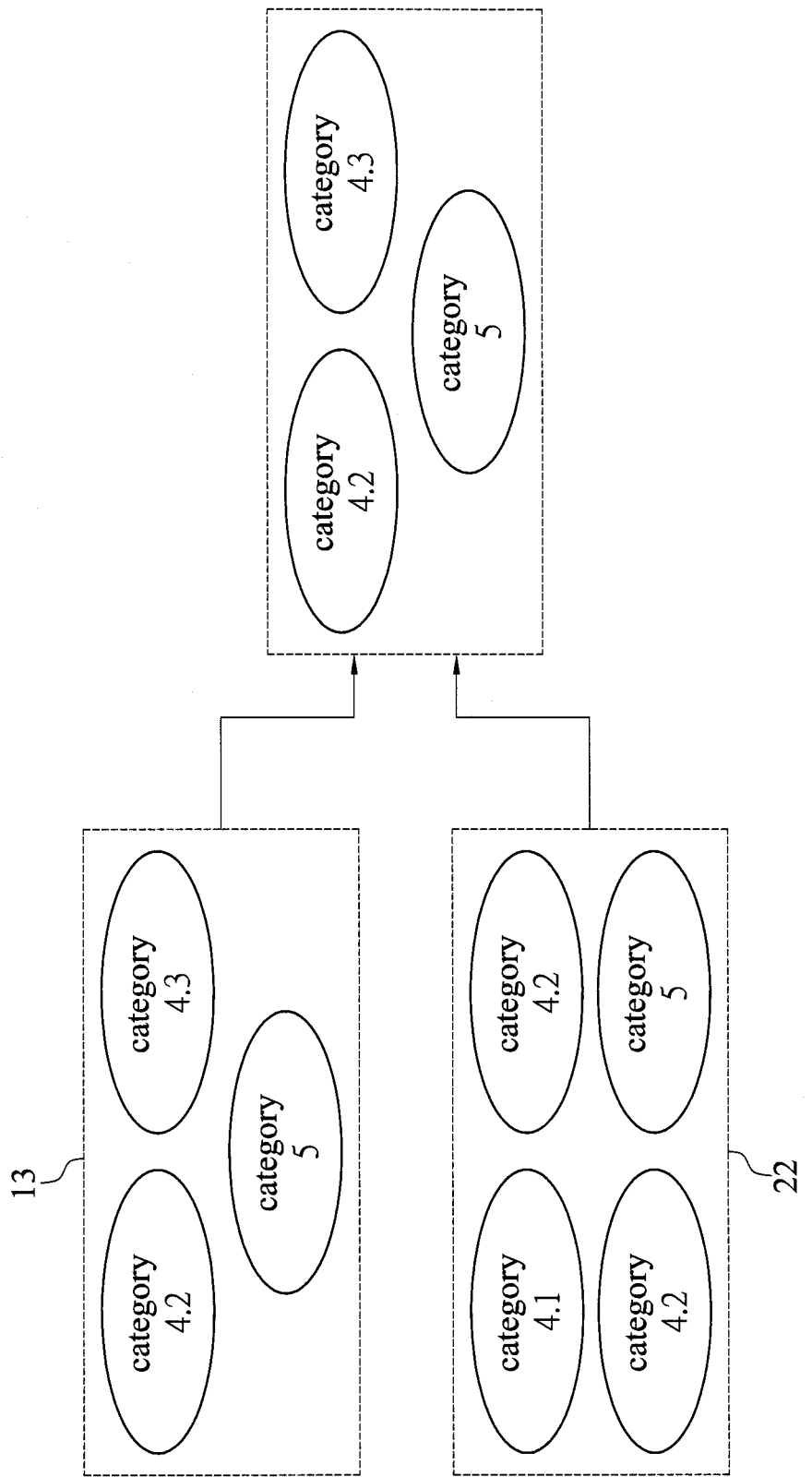
FIG. 7 is a diagram illustrating final classification according to the present invention.

Please refer to FIG. 7, which is a schematic diagram of final classification according to the present invention. In the process of final classification, the first final category 13 and the second final category 22 are integrated to perform the classification. The classifying method is the same as the initial classification, which classifies the first final category 13 and the second final category 22 into five subsets based on the BI-RADS classification standard. Thus, the detail of the process of final classification is omitted.

Since the final classification only addresses to the classification of malign tumors, and the benign tumors are not consider, the category 3 and category 4.1 obtained in the final classification are classified to category 4.2.

In the final classification, the adjustment rule of the second parameter α comprises:

1. The number of malign instances in $S^{Ensemble3}_{BIRADS5}$ equals to 0, such that the subsets obtained in the final classification only include $S^{Ensemble3}_{BIRADS4.1}$, $S^{Ensemble3}_{BIRADS4.2}$, $S^{Ensemble3}_{BIRADS4.3}$ and $S^{Ensemble3}_{BIRADS5}$, wherein $S^{Ensemble3}_{BIRADS4.1}$, $S^{Ensemble3}_{BIRADS4.2}$, $S^{Ensemble3}_{BIRADS4.3}$ and $S^{Ensemble3}_{BIRADS5}$ present subsets of category 4.1, category, 4.2, category 4.3 and category 5 of the final classificaiton, respectively;

2. When the rule 1 is satisfied, the one having the most samples remaining in $S^{Ensemble3}_{BIRADS5}$ is selected;

3. If the number of parameter satisfying rule 2 is more than one, then compares the summation of squares differences of malign probability and the malign probability point in a set of standard BI-RADS in four subsets of $S^{Ensemble3}_{BIRADS4.1}$, $S^{Ensemble3}_{BIRADS4.2}$, $S^{Ensemble3}_{BIRADS4.3}$ and $S^{Ensemble3}_{BIRADS5}$. The one with the smallest summation of squares differences is selected as an elected parameter, and the method of calculation is as follow.

$$SSD^2_{Ensemble3} = \left[\left(\frac{N^{S^{Ensemble3}_{BIRADS4.1}}_{Mal} + N^{S^{Ensemble3}_{BIRADS4.2}}_{Mal}}{N^{S^{Ensemble3}_{BIRADS4.1}} + N^{S^{Ensemble3}_{BIRADS4.2}}}\right)|\alpha| - 0.375\right]^2 +$$
$$\left[\left(\frac{N^{S^{Ensemble3}_{BIRADS4.3}}_{Mal}}{N^{S^{Ensemble3}_{BIRADS4.3}}}\right)|\alpha| - 0.695\right]^2 + \left[\left(\frac{N^{S^{Ensemble3}_{BIRADS5}}_{Mal}}{N^{S^{Ensemble3}_{BIRADS5}}}\right)|\alpha| - 0.945\right]^2$$

In the calculation, the parameter α increases from 0 to 2 in an increment of 0.01. That is, α=0, 0.01, . . . , 2; $N^{S^{Ensemble3}_{BIRADS4.1}}_{Mal}$ presents the number of malign instances in the subset of category 4.1, $N^{S^{Model3}_{BIRADS4.1}}$ presents the amount of samples in $S^{Model3}_{BIRADS4.1}$, and so on.

4. If the number of parameter satisfying rule 3 is more than one, then the parameter closest to the theoretical value 2 is selected as an elected parameter.

After the hierarchical classification including initial classification, second classification and final classification, the adaptable classification method of the present invention has been able to classify between benign tumors and malign tumors of a plurality of samples 10, and perform the classification addressing to the category of malign tumors. Hence, the verification of the classifying device 11 is complete.

After the verification is complete, at least one new sample is provided to the classifying device of initial classification to perform the classification to the new sample. If the initial classification result is category 3 or category 4.1 of the BI-RADS classification standard, the new sample is retrieved by the classifying device 11 of second classification to perform the classification of malign tumors. If the classification result is category 3, it means the new sample is benign, and the classification is complete.

If the initial classification result is one of categories 4.2, 4.3 or 5, or the second classification result is category 4.1, then the new sample is retrieved by the classifying device 11 of final classification to perform the classification of malign tumors.

Please refer to FIG. 8, which is a classification table of tumor characteristics. As shown in the classification table, after the new samples are hierarchically classified through the adaptable classification method according the present invention, the classified category of the tumor is known. However, in order to clearly understand the classifying basis of each classifying device 11 to the sample, election results addressing the tumor property to determine benign and malign tumors are integrated, as shown in FIG. 8.

In FIG. 8, column 31 is classification information after the integration, which from left to right includes the number of sample, the types of classifying devices applied to the sample, total votes and the specification result of the adaptable classification method of the present invention for the sample.

Column 32 is the majority opinion in the classification vote performed by all sub-classifying devices of the classifying device that the sample undergoes. The majority opinion from left to right includes tumor characteristic that the vote is based on, votes gained by the characteristic and the percentage of vote of each characteristic, which is the votes obtained by the characteristic divided by the amount of votes.

Column 33 is the minority opinion in the classification vote performed by all sub-classifying devices of the classifying device that the sample undergoes. The minority opinion from left to right includes tumor characteristic that the vote is based on, votes gained by the characteristic and the percentage of vote of each characteristic, which is the votes obtained by the characteristic divided by the amount of votes.

The invention further provides a computer readable recording medium for storing the computer program which can be applied in a computer device such that the computer device executes the abovementioned method. The recording medium may be a soft disk, hard disk, CD, flash drive, tape or other recording medium having the same function.

From the above, the adaptable classification method of the present invention address to more critical categories by using the hierarchical classification method to perform the second classification for at least one time to improve the accuracy of the classification result. Categories other than critical categories can also be classified based on predetermined classification standard to perform different managements addressing to different categories in the subsequent process.

Beside, the present invention provides the classifying basis when the samples undergo the classification process after the classification to provide related employees references for the specification.

The above embodiments only exemplarily specify the concept and effect of the present invention, but not intend to limit the present invention. Any person skilled in the art can perform modifications and adjustments on the above embodiments without departing the spirit and category of the present invention.

What is claimed is:

1. An adaptable classification method having a classification standard of a plurality of categories that are classifiable according to probability values, the adaptable classification method comprising:
   (1) providing a plurality of samples to train a classifying device;
   (2) determining categories of the samples, by using the trained classifying device, to obtain classification model scores of the samples;
   (3) transferring the classification model scores into probability values by logistic-like functions having parameters, and classifying the probability values into the categories based on the classification standard; and
   (4) determining whether the probability values conform to value ranges corresponding to the categories of the classification standard, and stopping training the classifying device if the probability values conform to the value ranges, or adjusting the parameters of the logistic-like functions and transferring the classification model scores into new probability values by the adjusted logistic-like functions and iterating step (4) to determine whether the new probability values conform to the value ranges.

2. The adaptable classification method of claim 1, further comprising classifying new samples, by using the trained classifying device, to obtain a corresponding category of the new samples in the classification standard.

3. The adaptable classification method of claim 1, wherein the classifying device includes a plurality of sub-classifying devices.

4. The adaptable classification method of claim 3, wherein the sub-classifying devices have respective weights.

5. The adaptable classification method of claim 4, wherein the weights of the sub-classifying devices are determined by an AdaBoost method based on classification determination ability of sub-specifying device with respect to the samples.

6. The adaptable classification method of claim 1, wherein the classifying device is a linear or nonlinear statistic learning classifying device or mechanical learning classifying device.

7. The adaptable classification method of claim 1, wherein in step (4) the parameters of the logistic-like function are adjusted based on a parameter adjustment rule.

8. The adaptable classification method of claim 1, further comprising classifying the classified samples into at least two subcategories, and performing steps (1) to (4) on the subcategories.

* * * * *